United States Patent
Grubb et al.

(10) Patent No.: US 6,704,139 B2
(45) Date of Patent: *Mar. 9, 2004

(54) OPTICAL SYSTEMS AND METHODS AND OPTICAL AMPLIFIERS FOR USE THEREIN

(75) Inventors: Stephen G. Grubb, Columbia, MD (US); John J. Veselka, Jr., Clarksville, MD (US); Donald M. Cornwell, Jr., Silver Spring, MD (US)

(73) Assignee: Corvis Corporation, Columbia, MD (US)

( * ) Notice: Subject to any disclaimer, the term of this patent is extended or adjusted under 35 U.S.C. 154(b) by 1 day.

This patent is subject to a terminal disclaimer.

(21) Appl. No.: 10/256,591

(22) Filed: Sep. 27, 2002

(65) Prior Publication Data

US 2003/0025989 A1 Feb. 6, 2003

Related U.S. Application Data

(63) Continuation of application No. 09/998,525, filed on Nov. 30, 2001, now Pat. No. 6,459,529, which is a continuation of application No. 09/517,661, filed on Mar. 3, 2000, now Pat. No. 6,344,925.

(51) Int. Cl.$^7$ .................................................. H01J 3/00
(52) U.S. Cl. ..................................... 359/345; 359/341.3
(58) Field of Search ............................. 359/345, 341.3, 359/341.1

(56) References Cited

U.S. PATENT DOCUMENTS

| 4,315,666 A | 2/1982 | Hicks, Jr. |
| 4,342,499 A | 8/1982 | Hicks, Jr. |
| 4,401,364 A | 8/1983 | Mochizuki |
| 4,616,898 A | 10/1986 | Hicks, Jr. |
| 4,699,452 A | 10/1987 | Mollenauer et al. |
| 4,728,170 A | 3/1988 | Robertson |

(List continued on next page.)

FOREIGN PATENT DOCUMENTS

| EP | 0 734 105 A2 | 9/1996 |
| EP | 0853396 A2 | 7/1998 |
| JP | 07202306 A | 8/1995 |
| WO | WO 98/42088 | 9/1998 |

OTHER PUBLICATIONS

Park, S.Y., et al., Feasibility Demonstration of 10 Gbit/s Channel WDM Network Using Dynamic Gain–Controlled EDFAs, Electronic Letters, Mar. 5$^{th}$, 1998, vol. 34, No. 5., Online No. 19980346.

Dung, J.C., et al., Gain Flattening of Erbium Doped Fibre Amplifier Using Fibre Bragg Gratings, Electronics Letters, Mar. 19$^{th}$, 1998, vol. 34, No. 6., Online No. 19980446.

(List continued on next page.)

Primary Examiner—Mark Hellner

(57) ABSTRACT

Optical transmission systems of the present invention include at least one optical amplifier in which pump power being provided to an amplifying medium is amplified using a pump amplifier prior to being introduced into the amplifying medium. In various embodiments, a cascaded Raman resonator is used as a pump booster source to provide Raman amplification of the pump power being supplied from one or more pump sources to the signal channel amplifying medium.

20 Claims, 5 Drawing Sheets

U.S. PATENT DOCUMENTS

| | | | |
|---|---|---|---|
| 4,881,790 A | 11/1989 | Mollenauer | |
| 5,039,199 A | 8/1991 | Mollenauer et al. | |
| 5,050,949 A | 9/1991 | DiGiovanni | |
| 5,083,874 A | 1/1992 | Aida et al. | |
| 5,095,519 A | 3/1992 | Dorsey | |
| 5,191,586 A | 3/1993 | Huber | |
| 5,191,628 A | 3/1993 | Byron | |
| 5,228,105 A | 7/1993 | Glista | |
| 5,283,686 A | 2/1994 | Huber | |
| 5,323,404 A | 6/1994 | Grubb | |
| 5,406,411 A | 4/1995 | Button et al. | |
| 5,473,622 A | 12/1995 | Grubb | |
| 5,500,756 A | 3/1996 | Tsushima et al. | |
| 5,530,583 A | 6/1996 | Uno et al. | |
| 5,541,766 A | 7/1996 | Mizrahi et al. | |
| 5,557,442 A | 9/1996 | Huber | |
| 5,579,143 A | 11/1996 | Huber | |
| 5,623,508 A | 4/1997 | Grubb et al. | |
| 5,633,974 A | 5/1997 | Chia | |
| 5,636,301 A | 6/1997 | O'Sullivan et al. | |
| 5,651,085 A | 7/1997 | Chia | |
| 5,673,280 A | 9/1997 | Grubb et al. | |
| 5,675,432 A | 10/1997 | Kosaka | |
| 5,694,512 A | 12/1997 | Gonthier et al. | |
| 5,696,615 A | 12/1997 | Alexander | |
| 5,717,510 A | 2/1998 | Ishikawa et al. | |
| 5,764,406 A | 6/1998 | Newhouse et al. | |
| 5,805,621 A | 9/1998 | Grubb et al. | |
| 5,812,710 A | 9/1998 | Sugaya | |
| 5,815,299 A | 9/1998 | Bayart et al. | |
| 5,861,981 A | 1/1999 | Jabr | |
| 5,880,866 A | 3/1999 | Stolen | |
| 5,883,736 A | 3/1999 | Oshima et al. | |
| 5,892,615 A | 4/1999 | Grubb et al. | |
| 5,900,969 A | 5/1999 | Srivastava et al. | |
| 5,903,371 A | 5/1999 | Arecco et al. | |
| 5,920,423 A | 7/1999 | Grubb et al. | |
| 5,959,750 A | 9/1999 | Eskildsen et al. | |
| 5,963,361 A | 10/1999 | Taylor et al. | |
| 5,999,548 A | 12/1999 | Mori et al. | |
| 6,031,646 A | 2/2000 | Sniadower | |
| 6,055,092 A | 4/2000 | Sugaya et al. | |
| 6,057,959 A | 5/2000 | Taylor et al. | |
| 6,081,366 A | 6/2000 | Kidorf et al. | |
| 6,115,174 A | 9/2000 | Grubb et al. | |
| 6,118,575 A | 9/2000 | Grubb et al. | |
| 6,122,298 A | 9/2000 | Kerfoot, III et al. | |
| 6,147,794 A | 11/2000 | Stentz | |
| 6,151,338 A | 11/2000 | Grubb et al. | |
| 6,181,465 B1 | 1/2001 | Grubb et al. | |
| 6,212,310 B1 | 4/2001 | Waarts et al. | |
| 6,236,498 B1 | 5/2001 | Freeman et al. | |
| 6,344,925 B1 * | 2/2002 | Grubb et al. | 359/345 |
| 6,459,529 B1 * | 10/2002 | Grubb et al. | 359/341.3 |

OTHER PUBLICATIONS

Masuda, H., et al., Ultra–Wideband Optical Amplification with a 3–dB Bandwidth of 67 nm Using a Partially Gain Flattened Erbium–Doped Fiber Amplifier and Raman Amplification, Optical Amplifiers and their Application, Aug. 3–5, 1994, 1997 OSA Technical Digest Series, V20, pp. MC3–1–4/40–3.

Sugaya, Y., et al., Novel Configuration for Low–Noise and Wide–Dynamic–Range Er–Doped Fiber Amplifiers for WDM Systems, Optical Amplifiers and their Application, Jun. 15–17, 1995, 1995 OSA Technical Digest Series, V18, pp. FC3–1–4/158–161.

Jacobovitz–Veselka, G.R., et al., Single–Stage Booster Amplifier with Two 980 nm Pumps Stabilized by Fiber Gratings, Optical Amplifiers and their Application, Jun. 15–17, 1995, 1995 OSA Technical Digest Series, V18, pp. FC4–1–4/162–165.

Hansen, P.B., et al., Loss Compensation in Dispersion Compensating Fiber Modules by Raman Amplification, OFC'98 Technical Digest pp. 20–21.

Rottwitt, K., et al., Detailed Analysis of Raman Amplifiers for Long–Haul Transmission, OFC'98 Technical Digest pp. 30–31.

Chernikov, S.V., et al., 10 Gbit/s Error–Free Transmission of 2–ps Pulses Over a 45–km Span Using Distributed Raman Amplification at 1300 nm, OFC'98 Technical Digest p. 31.

Kawai, S., et a., Ultrawide 75 nm 3–dB Gain–Band Optical Amplifier Utilizing Erbium–Doped Fluoride Fiber and Raman Fiber, OFC'98 Technical Digest pp. .32–33.

Dianov, E.M., et al., Highly Efficient 1.3 $\mu$m Raman Amplifier, OFC'98 Technical Digest pp. 33–34.

Rottwitt, K., et al., A 92 nm Bandwidth Raman Amplifier, OFC'98, Post–Deadline Paper PD6–1–4.

Srivastava, A. K., et al., 1 Tb/s Transmission of 100 WDM 10 Gb/s Channels Over 400 km of TrueWave Fiber, OFC'98, Post–Deadline Paper PD10–1–4.

Masuda, H., et al., Ultra–Wideband Hybrid Amplifier Comprising Distributed Raman Amplifier and Erbium–Doped Fiber Amplifier, Electronics Letters, Jun. 25$^{th}$, 1998, vol. 34, No. 13, Online No. 19980935.

Zou et al., Compensation of Raman Scattering and EDFA's Nonuniform Gain in Ultra–Long–Distance WDM Links, IEEE Photonics Technology Letters, vol. 8, No. 1, Jan. 1996, pp. 139–141.

Grubb, S. G., Raman Amplifiers for Broadband Communications, OFC '98, OSA Technical Digest Series vol. 2, 1998, abstract.

Wen, Senfar, et al., IEEE Photonics Technology Letters, Feb. 1992, vol. 4, No.2, New York, US, pp. 189–192, IEEE Log Number: 9105789.

Yu, A., et al., Analysis of Optical Gain and Noise Spectral Properties of Erbium–Doped Fiber Amplifier Cascade, Optical Amplifiers and their Application, Aug. 3–5, 1994, 1994 OSA Technical Digest Series, V14, pp. FB1–1–3/124–126.

Takano, K., et al., An Optical Pre–Amplifier with Automatic Gain Control Function, Proceedings of the 1995 IEICE General Conference, Mar. 27–30, 1995, Fukuoka, Fukuoka Institute of Technology b–1067, p. 513.

Aide, K., et al., Long–Span Repeaterless IM/DD Optical Transmission Experiment over 300 KM using Optical Amplifiers, ICC '91, vol. 3, pp. 1228–1232, 1991, Published: New York, NY, USA.

Stentz A., et al., OSA Trends in Optics and Photonics, vol. 5 Optical Amplifiers and Their Applications. From the Topical Meeting, pp. 350–368, Published: Washington, DC, USA, 1996.

* cited by examiner

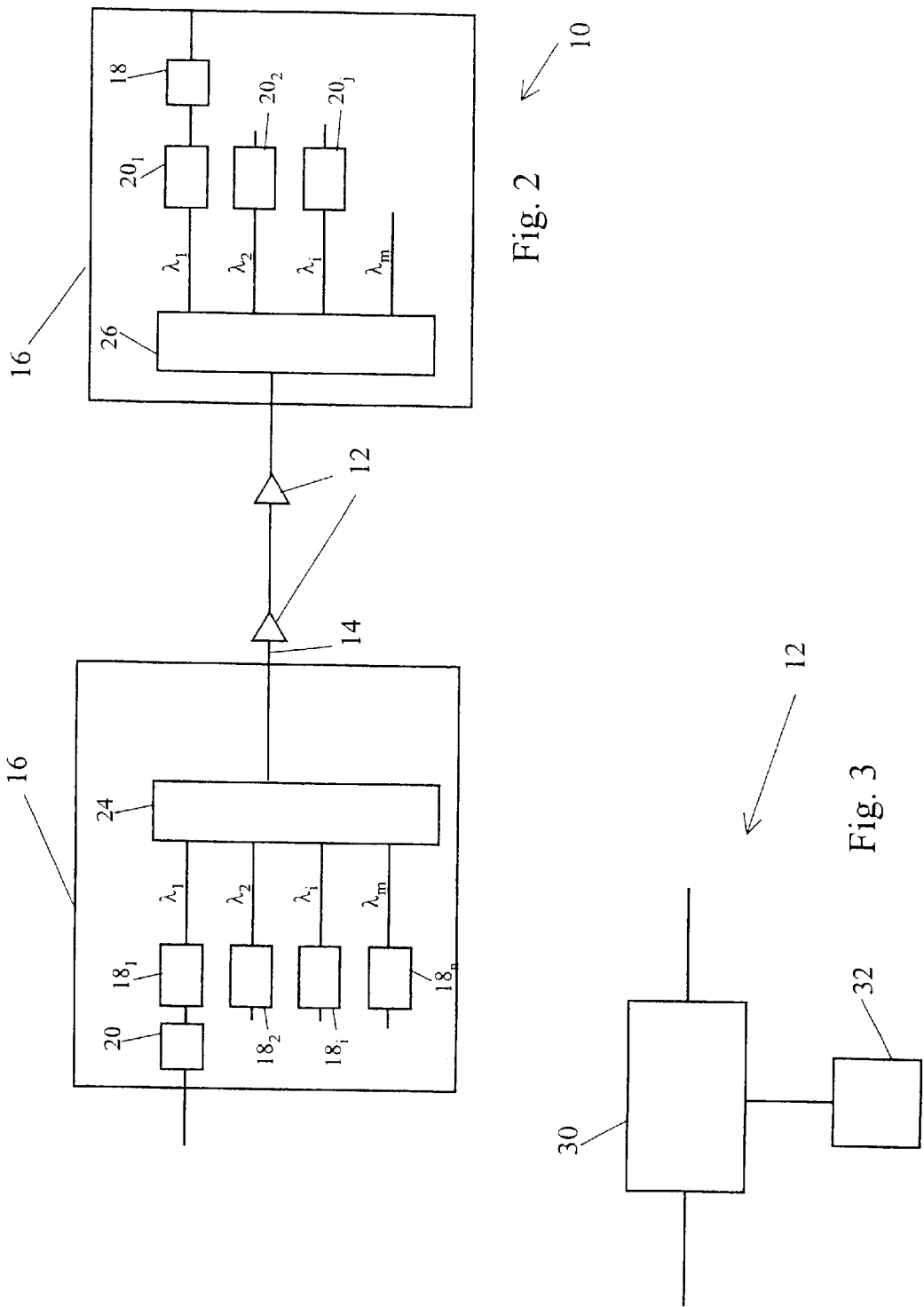

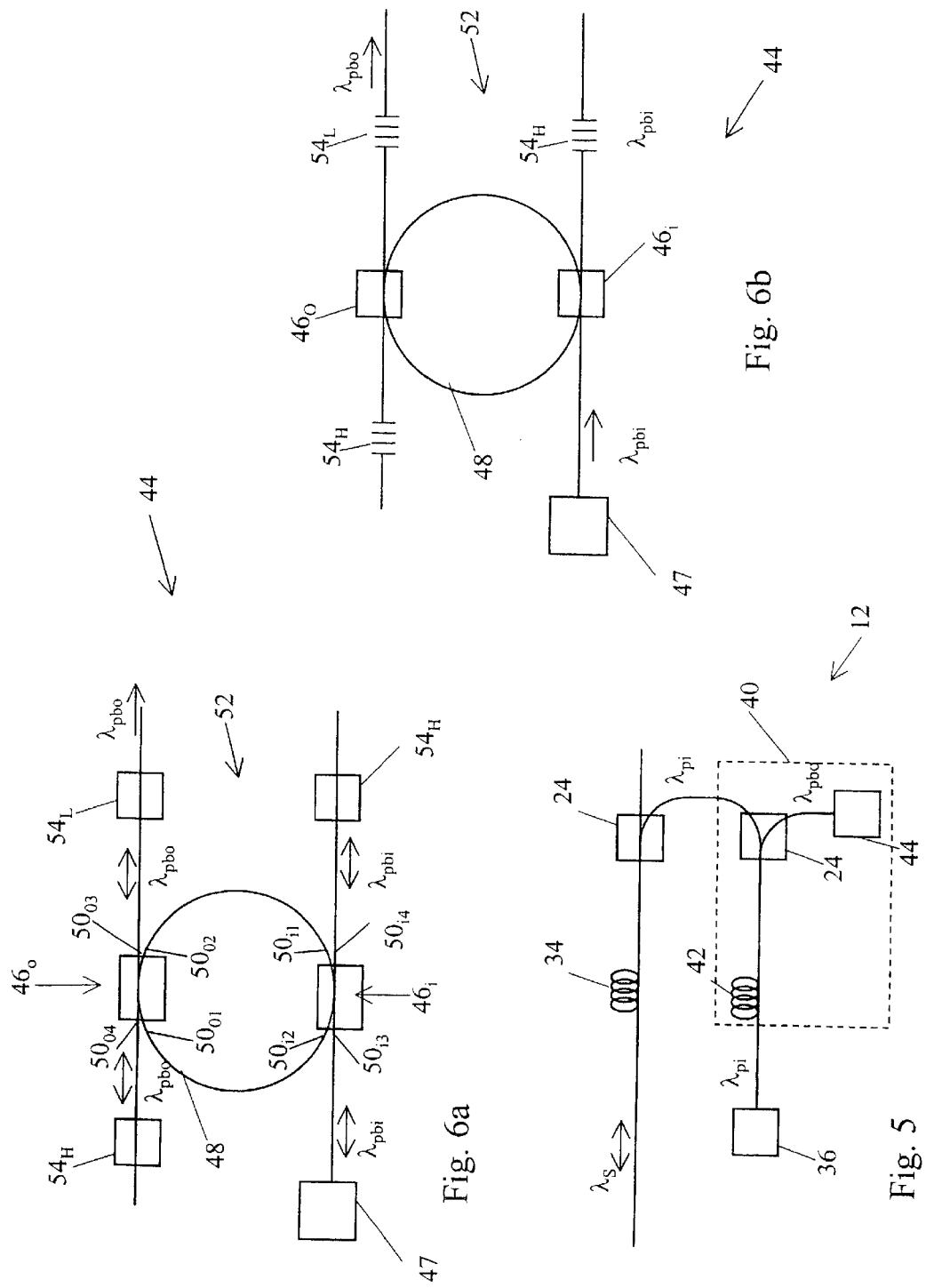

OPTICAL SYSTEMS AND METHODS AND OPTICAL AMPLIFIERS FOR USE THEREIN

CROSS-REFERENCE TO RELATED APPLICATIONS

This application is a continuation of U.S. patent application Ser. No. 09/998,525, now U.S. Pat. No. 6,459,529 filed Nov. 30, 2001, which is a continuation of U.S. patent application Ser. No. 09/517,661, now U.S. Pat. No. 6,344,925 filed Mar. 3, 2000, both of which are incorporated herein by reference.

STATEMENT REGARDING FEDERALLY SPONSORED RESEARCH OR DEVELOPMENT

Not Applicable

BACKGROUND OF THE INVENTION

The present invention is directed generally to optical transmission systems. More particularly, the invention is directed toward optical transmission systems including higher performance optical amplifiers.

Digital technology has provided electronic access to vast amounts of information. The increased access has driven demand for faster and higher capacity electronic information processing equipment (computers) and transmission networks and systems to link the processing equipment.

In response to this demand, communications service providers have turned to optical communication systems, which have the capability to provide substantially larger information transmission capacities than traditional electrical communication systems. Information can be transported through optical systems in audio, video, data, or other signal format analogous to electrical systems. Likewise, optical systems can be used in telephone, cable television, LAN, WAN, and MAN systems, as well as other communication systems.

Early optical transmission systems, known as space division multiplex (SDM) systems, transmitted one information signal using a single wavelength in separate waveguides, i.e. fiber optic strand. The transmission capacity of optical systems was increased by time division multiplexing (TDM) multiple low bit rate, information signals into a higher bit rate signals that can be transported on a single optical wavelength. The low bit rate information carried by the TDM optical signal can then be separated from the higher bit rate signal following transmission through the optical system.

The continued growth in traditional communications systems and the emergence of the Internet as a means for accessing data has further accelerated the demand for higher capacity communications networks. Telecommunications service providers, in particular, have looked to wavelength division multiplexing (WDM) to further increase the capacity of their existing systems.

In WDM transmission systems, pluralities of distinct TDM or SDM information signals are carried using electromagnetic waves having different wavelengths in the optical spectrum, typically in the infrared portion of the spectrum. The pluralities of information carrying wavelengths are combined into a multiple wavelength WDM optical signal that is transmitted in a single waveguide. In this manner, WDM systems can increase the transmission capacity of existing SDM/TDM systems by a factor equal to the number of wavelengths used in the WDM system.

Optical WDM systems were not initially deployed, in part, because of the high cost of electrical signal regeneration equipment required approximately every 20–50 km to compensate for signal attenuation for each optical wavelength throughout the system. The development of the erbium doped fiber optical amplifier (EDFA) provided a cost effective means to optically amplify attenuated optical signal wavelengths in the 1550 nm range. In addition, the 1550 nm signal wavelength range coincides with a low loss transmission window in silica based optical fibers, which allowed EDFAs to be spaced further apart than conventional electrical regenerators.

The use of EDFAs essentially eliminated the need for, and the associated costs of, electrical signal regeneration/amplification equipment to compensate for signal attenuation in many systems. The dramatic reduction in the number of electrical regenerators in the systems, made the installation of WDM systems in the remaining electrical regenerators a cost effective means to increase optical network capacity.

WDM systems have quickly expanded to fill the limited amplifier bandwidth of EDFAs. New erbium-based fiber amplifiers (L-band) have been developed to expand the bandwidth of erbium-based optical amplifiers. Also, new transmission fiber designs are being developed to provide for lower loss transmission in the 1380–1530 nm and 1600–1700 nm ranges to provide additional capacity for future systems.

Raman fiber amplifiers ("RFAs") are also being investigated for use in wide bandwidth, e.g., 100 nm, optical amplifiers, but RFAs generally make less efficient use of pump power than EDFAs. Therefore, RFAs have not been deployed in commercial systems because significant pump powers on the order of hundreds of milliwatts are required to achieve the required levels of amplification.

RFAs do, however, have appeal as a viable option for next generation optical amplifiers, because RFAs provide low noise, wide bandwidths, and wavelength flexible gain.

Commonly assigned U.S. patent application Ser. Nos. 09/119,556 and 09/253,819, which are incorporated herein by reference, describe RFAs that can be deployed in existing fiber optic networks having various fiber designs and compositions and over a wide range of signal wavelengths.

RFAs are theoretically scalable to provide amplification over a range of bandwidths and power. However, the amplification bandwidth and power is limited, in part, by the amount of pump power that can be delivered to the fiber amplifier. The capability to provide higher pump powers is essential for continued development of optical amplifiers and optical systems to meet the requirements of next generation optical systems.

BRIEF SUMMARY OF THE INVENTION

The systems, apparatuses, and methods of the present invention address the above needs to provide higher performance optical amplifiers and systems. The optical systems generally include at least one optical transmitter configured to transmit information via at least one optical signal wavelength, or channel, to at least one optical receiver via optical transmission media, such as an optical fiber. The system will also include at least one optical amplifier disposed between the transmitters and receivers to overcome various signal power losses, such as media attenuation, combining, splitting, etc. in the system.

The optical amplifier will generally include an optical signal amplifying medium supplied with pump power in the form of optical energy in one or more pump wavelengths via an optical pump source. The pump source can include one or more optical sources, such as narrow and broad band lasers or other coherent, as well as incoherent sources.

The optical amplifier will further include a pump amplifier configured to amplify the pump power being supplied to the signal amplifying media. In various embodiments, the pump amplifier includes a pump amplifying medium supplied with pump booster power in the form of optical energy from a pump booster source. The pump amplifying medium can include various amplifying fibers as may be appropriate for amplifying the pump power. The pump amplifier can be configured to provide Raman amplification of the pump power being supplied to at least one amplifying media to optically amplify signal wavelengths passing through the amplifying media. For example, the pump booster power can be supplied in the 1300–1450 range to provide Raman amplification of pump wavelengths in the 1400–1500 range in the pump amplifier.

In addition, the pump booster power can be split and used to amplify pump power being supplied to multiple optical amplifiers disposed along one or more transmission fibers. In this manner, the pump booster power, which can be several watts, and the cost of the pump booster source can be spread over a number of amplifiers in the system. It may be also be desirable to combine the power from two or more pump booster source prior to splitting the pump booster power to amplify the RFA pump wavelengths to provide additional redundancy in the system.

In various embodiments, a cascaded Raman resonator ("CRR") and/or semiconductor laser diodes can be used as the pump booster source to provide pump booster power to amplify the pump power provided by the pump sources. The pump power supplied by each of the optical sources in the pump source can be varied to control the overall pump power distribution over the pump wavelength range.

In various CRR embodiments, CRR input power in at least one input wavelength is introduced into a fiber Raman resonator ring via an input wavelength division multiplexing (WDM) coupler. An output WDM coupler is further coupled to resonator ring to output the pump booster power at an appropriate wavelength to supply optical energy for use in the pump amplifying fiber.

The use of pump amplifier external to the transmission fiber in the present invention provides flexibility in the optical amplifier design. For example, lower power optical sources can be employed in the pump sources, thereby reducing component costs in the system. The optical sources can be individually controlled and fine tuned before the pump power is amplified. When Raman pump amplifiers are used, the wavelength and relative power of the optical sources can be varied within the Raman gain bandwidth of the pump amplifier to vary the wavelength profile of the pump power provided to the amplifier without changing the pump amplifier. Thus, the optical amplifiers of the present invention provide increased power, control, flexibility, and upgradability necessary for higher performance optical systems. These advantages and others will become apparent from the following detailed description.

BRIEF DESCRIPTION OF THE DRAWINGS

Embodiments of the present invention will now be described, by way of example only, with reference to the accompanying drawings for the purpose of illustrating present embodiments only and not for purposes of limiting the same, wherein like members bear like reference numerals and:

FIGS. 1 and 2 show optical system embodiments;

FIGS. 3–4 show optical amplifier embodiments; and,

FIGS. 5–7 show various optical amplifier and pump amplifier embodiments.

DETAILED DESCRIPTION OF THE INVENTION

Figure 1:
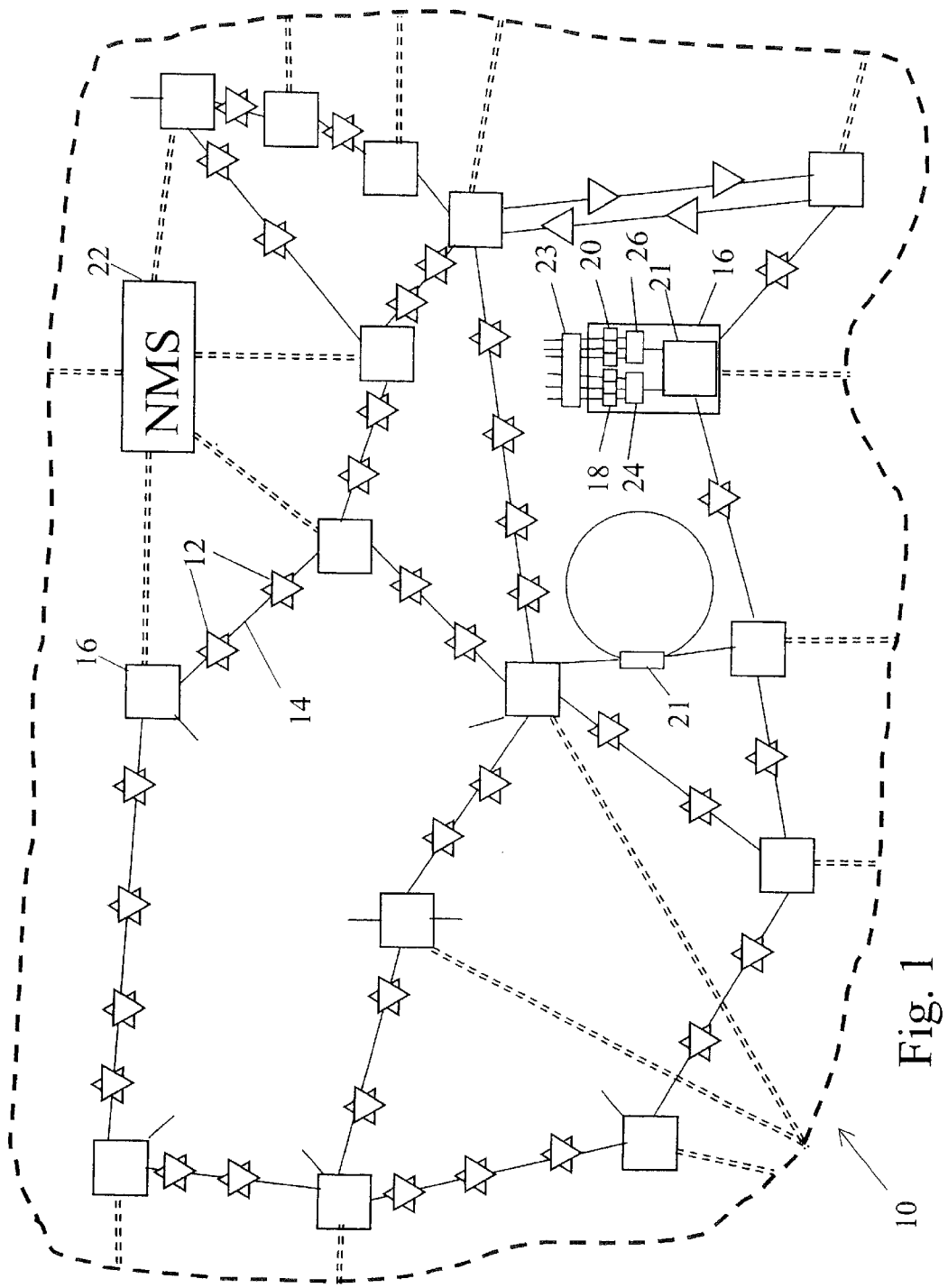
Figure 4B:
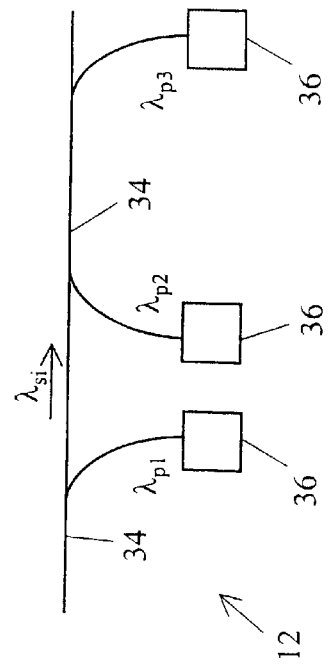
Figure 4D:
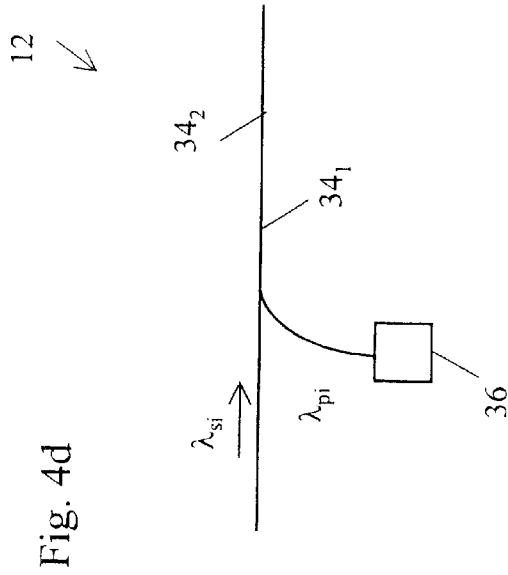
Figure 4A:
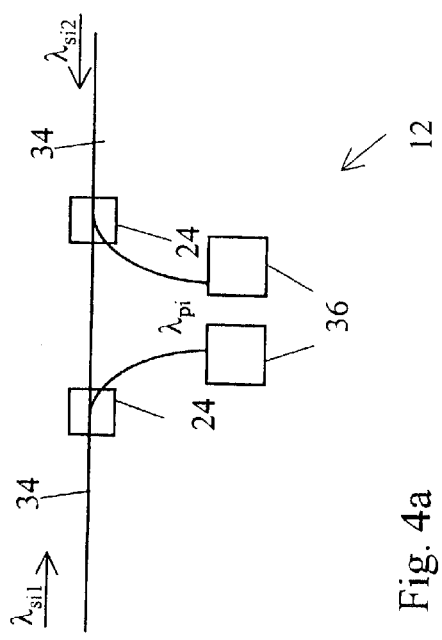
Figure 4C:
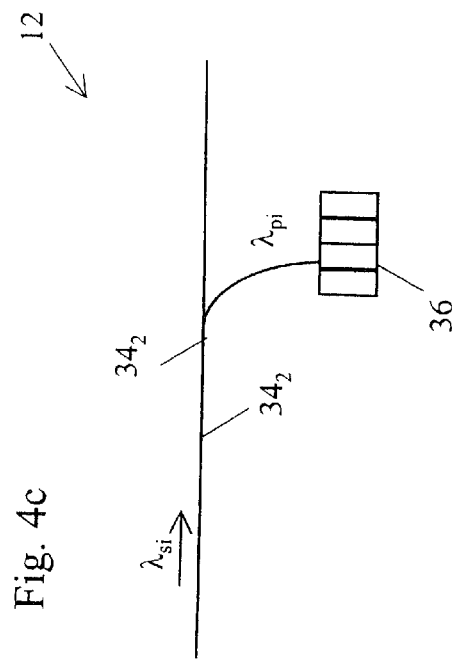

Optical systems 10 of the present invention include an optical amplifier 12 disposed along an optical transmission medium, such as an optical fiber 14, to optically amplify optical signals passing between optical processing nodes 16. One or more transmitters 18 can be included in the nodes 16 and configured to transmit information via the optical signals in one or more information carrying signal wavelengths, or signal channels, $\lambda_{si}$ to one or more optical receivers 20 in other nodes 16. The optical system 10 can be controlled by a network management system 22 and configured in multi-dimensional networks (FIG. 1) or in one or more serially connected point to point links (FIG. 2). The network management system 22 can communicate with the various nodes and elements in the optical systems 10 via wide area networks external to the system 10 and/or supervisory optical channels within the system 10.

The optical processing nodes 16 may also include other optical components, such as one or more add/drop devices and optical and electrical switches/routers/cross-connects 21 interconnecting the transmitters 18 and receivers 20. For example, broadcast and/or wavelength reusable, add/drop devices, and optical and electrical/digital cross connect switches and routers can be configured via the network management system 22 in various topologies, i.e., rings, mesh, etc. to provide a desired network connectivity.

The transmitters 18 used in the system 10 will generally include a narrow bandwidth laser optical source that provides an optical carrier. The transmitters 18 also can include other coherent narrow or broad band sources, such as sliced spectrum sources, as well as suitable incoherent optical sources as appropriate. Information can be imparted to the optical carrier either by directly modulating the optical source or by externally modulating the optical carrier emitted by the source. Alternatively, the information can be imparted to an electrical carrier that can be upconverted using the optical carrier onto an optical wavelength to produce the optical signal. Similarly, the optical receiver 20 used in the present invention can include various detection techniques, such coherent detection, optical filtering and direct detection, and combinations thereof. Employing tunable transmitters 18 and receivers 20 in the optical nodes 16 in a network, such as in FIG. 2, can provide additional versatility in the system 10.

The transmitters 18 and receivers 20 can be also connected to interfacial devices 23, such as electrical and optical cross-connect switches, IP routers, etc., to provide interface flexibility within, and at the periphery of, the optical system 10. The interfacial devices 23 can be configured to receive, convert, and provide information in one or more various protocols, encoding schemes, and bit rates to the transmitters 22, and perform the converse function for the receivers 24. The interfacial devices 23 also can be used to provide protection switching in various nodes 16 depending upon the configuration.

Generally speaking, N transmitters 18 can be used to transmit M different signal wavelengths to J different receivers 20. In various embodiments, one or more of the transmitters 18 and/or receivers 20 can be wavelength tunable to provide wavelength allocation flexibility in the optical system 10. In addition, the system 10 can also be configured to carry uni- and bi-directional traffic.

Optical combiners 24 can be used to combine the multiple signal channels into WDM optical signals and pump wavelengths $\lambda_{pi}$. Likewise, optical distributors 26 can be provided to distribute the optical signal to the receivers $20_j$ and optical signal and pump wavelengths $\lambda_{pi}$ to multiple paths. The optical combiners 24 and distributors 26 can include various multi-port devices, such as wavelength selective and non-selective ("passive"), fiber and free space devices, as well as polarization sensitive devices. The multi-port devices can various devices, such as circulators, passive, WDM, and polarization couplers/splitters, dichroic devices, prisms, diffraction gratings, arrayed waveguides, etc. The multi-port devices can be used alone or in various combinations along with various tunable or fixed wavelength filters in the optical combiners 24 and distributors 26. The filters can include various transmissive or reflective, narrow or broad band filters, such as Bragg gratings, Mach-Zehnder, Fabry-Perot and dichroic filters, etc. Furthermore, the combiners 24 and distributors 26 can include one or more stages incorporating various multi-port device and filter combinations to multiplex, consolidate, demultiplex, multicast, and/or broadcast signal channels $\lambda_{si}$ and pump wavelengths $\lambda_{pi}$ in the optical systems 10.

The optical amplifiers 12 generally include an optical amplifying medium 30 supplied with power from an amplifier power source 32 as shown in FIG. 3. For the sake of clarity, the optical amplifier 12 will be generally described in terms of an amplifying fiber 34 supplied with pump power in the form of optical energy from one or more pump sources 36, examples of which are shown in FIGS. 4a–d. It will be appreciated that optical amplifiers 12 could include planar optical amplifying devices, and can be used in combination with semiconductor amplifiers.

The amplifying fiber 34 will generally be a doped and/or Raman fiber supplied with pump power in one or more pump wavelengths $\lambda_{pi}$ suitable for amplifying the signal wavelengths $\lambda_{si}$ passing through the amplifying fiber 34. One or more dopants can be used in the doped amplifying fiber 34, such as Er, other rare earth elements, as well as other dopants. The Raman fibers can include various silica-based fibers, e.g., pure, P-doped and/or Ge-doped silica fibers, such as those commonly used as transmission fiber, dispersion compensating fiber, etc., as well as other fiber material suitable for providing Raman gain. The doped and Raman fiber can be supplied in optical energy in various pump wavelengths to amplify signal channels in other wavelengths. For example, signal channels in the 1550 nm wavelength range can be amplified by pumping an erbium doped fiber with pump power at various wavelengths, such as 1480, and 980 nm. Likewise, Raman fibers can be supplied with pump power over a wavelength range, such as 1450–1480 nm to amplify signal channels in the 1550 nm wavelength range. Other signal wavelengths ranges can also be employed, for example 1300 nm, in the optical system 10 as may be desired.

The amplifying fiber 34 can have the same or different transmission and amplification characteristics than the transmission fiber 14. For example, dispersion compensating fiber, dispersion shifted fibers, standard single mode fiber and other fiber types can be intermixed as or with the transmission fiber 14 depending upon the system configuration. Thus, the amplifying fiber 34 can serve multiple purposes in the optical system, such as performing dispersion compensation and different levels of amplification, as well as lossless transmission and variable attenuation, of the signal wavelengths $\lambda_{si}$.

The optical amplifier 12 can also include one or more serial and/or parallel amplifier stages, which may include combinations of one or more, distributed and concentrated amplifier stages. The optical amplifiers 12 may also include remotely pumped doped fiber or Raman amplifying fibers $34_i$ having different amplification and transmission characteristics, e.g., dispersion, etc., than the transmission fiber 14. The remotely pumped amplifying fiber $34_i$ can be pumped with excess pump power supplied to provide Raman gain in the transmission fiber 14 or via a separate fiber. In addition, the optical amplifier can include short lumped doped fiber amplifier stages operated in deep saturation using pump power being supplied to other stages.

Other optical signal varying devices, such attenuators, filters, isolators, and equalizers can be deployed before, between, and after various stages of the amplifier 12 to decrease the effective loss associated with devices. Similarly, signal processing devices, such as add/drop devices, routers, etc. can be included proximate the various amplifier stages.

Pump energy can be supplied to the amplifying fiber 34 in counter-propagating and/or co-propagating directions with respect to the propagation of the signal wavelengths $\lambda_{si}$, as shown in FIGS. 4a–d. It will be appreciated that in a bi-directional system 10, the pump wavelength $\lambda_{pi}$ will be counter-propagating relative to signal wavelengths $\lambda_{si}$ in one direction as well as co-propagating relative to signal wavelengths $\lambda_{si}$ in the other direction.

Pump power can be supplied separately to each amplifier stage or the pump power can be shared by splitting the pump power before it is introduced into the amplifier or by streaming excess pump power from one stage to another. In addition, pump reflectors can be used to increase the pump power utilization in one or more stages.

The pump source 36 can include one or more narrow and broad band lasers, or other coherent source, as well as incoherent sources, each providing pump power in wavelength bands centered about one or more pump wavelengths $\lambda_{pi}$. The pump wavelengths $\lambda_{pi}$ can be combined using combiners 24, such as fused tapered and dichroic couplers, polarization combiners, etc., before being introduced into the transmission fiber 14.

In the present invention, the optical amplifier 12 further includes a pump amplifier 40 configured to amplify the pump power being provided to the amplifying media 34. The pump amplifier 40 can be variously configured similar to the optical amplifier 12 for the signal wavelength $\lambda_{si}$. The pump amplifier 40 will generally include pump amplifying medium 42 supplied with pump booster power in the form of optical energy in one or more pump booster wavelengths $\lambda_{pbo}$ from a pump booster source 44. It may also be possible to use semiconductor amplifiers as the pump amplifier 40.

The pump amplifying medium 42 can be specifically tailored depending upon the desired amount of gain from the pump amplifier 40. Various types of amplifying medium can be used as discussed with respect to the amplifying medium 34 for the signal wavelengths $\lambda_{si}$. Unlike in the amplifying medium 34, the selection of the pump amplifying medium 42 is not limited by potential negative affects on the signal wavelength characteristics, because the signal wavelengths $\lambda_{si}$ do not pass through pump amplifying medium 42.

The pump amplifier 40 can be used to provide Raman amplification of the pump power. For example, the pump booster source 44 can provide booster pump power in the 850 nm and 1350 nm wavelength ranges to provide Raman amplification of pump wavelengths in the 980 nm and 1450 nm wavelength ranges, respectively. The pump booster power can be co- and/or counter-propagated relative to the pump wavelengths, although counter-propagating the pump booster power relative to the pump power may reduce interactions.

In various embodiments, the pump booster source 44 includes one or more high power semiconductor diodes, cascaded Raman resonators ("CRR"), as well as other high power sources, configured to supply pump booster power to optically amplify the pump power being supplied to at least one amplifying media. For example, commercially available CRRs from SDL, Inc. (San Jose, Calif.) have output wavelengths in the 1450–1480 nm range. CRRs generally include a resonator configured to shift input wavelengths $\lambda_{pbi}$ of light through one or more Stokes shifts to provide optical energy at successively longer wavelengths until a selected output wavelengths $\lambda_{pbo}$ is reached. The number of Stokes shift performed by the CRR depends upon the particular configuration of the CRR.

Various CRRs are suitable for use in the present invention. For example, U.S. Pat. Nos. 5,323,404 and 5,623,508 describe CRRs that use spaced pairs of Bragg gratings to produce a resonator cavity. Each pair of Bragg gratings corresponds to one of the Stokes wavelengths between the input wavelength and the desired output wavelength. Pairs of high reflectivity Bragg gratings are provided for each Stokes wavelength intermediate to the input and the output wavelengths. Low reflectivity Bragg gratings are provided at the inlet and outlet of the cavity to allow the input and output wavelengths into and out of the cavity, respectively.

Other CRR designs employ couplers and fiber rings to produce the Stokes shift. For example, in PCT International Publication No. WO 97/32378 an optical wavelength converter is provided that employs one or more fiber rings optically linked via couplers to produce a corresponding number of Stokes shifts in the light wavelength. Another coupler embodiment incorporates a coupler connecting a fiber ring to a light source and a high reflectivity mirror is discussed by Chernikov et al., Electronics Letters, Apr. 2, 1998, v. 34, n. 7, Online No. 19980421.

The present invention also includes hybrid grating/combiner CRR embodiments that provide increased flexibility over conventional grating and coupler CRR designs. The hybrid grating/combiner CRR embodiments employ input and output wavelength selective combiners, such as WDM couplers, 46$_i$ and 46$_o$, generally corresponding to the input and output wavelengths, $\lambda_{pbi}$ and $\lambda_{pbo}$, respectively. Optical fiber 48 or other Raman gain medium is used to interconnect two input wavelength WDM coupler ports 50$_{i1}$ and 50$_{i2}$ with two output wavelength WDM coupler ports 50$_{o1}$ and 50$_{o2}$ to produce a resonator cavity 52, as shown in FIGS. 6a&b. The input and output WDM couplers, 46$_i$ and 46$_o$, can be designed to have a broad range of bandwidths in the input and output wavelength range, respectively, to provide flexibility in the selection of the CRR source wavelengths.

In these embodiments, one or more input wavelengths $\lambda_{pbi}$ are provided by an input wavelength source 47, such as one or more lasers, and are selectively introduced into the resonator cavity 52 through a third input coupler port 50$_{i3}$. The input wavelength travels through the resonator cavity 52 and exits through a fourth input coupler port 50$_{i4}$. A high reflectivity (~100%) reflector 54$_H$ is position to reflect input wavelength light exiting the resonator cavity 52 through the fourth input coupler port 50$_{i4}$ back into the resonator cavity 52.

Similarly, the output wavelength $\lambda_{pbo}$ light selectively exits the resonator cavity 52 from third and fourth output wavelength WDM coupler ports, 50$_{o3}$ and 50$_{o4}$. A low reflectivity (~10%) reflector 54$_L$ is positioned to reflect a portion of the output wavelength light $\lambda_{pbo}$ exiting through the third output coupler port 50$_{o3}$ back into the resonator cavity 52 to provide feedback to the resonantor cavity 52. Another high reflectivity (~100%) reflector 54$_H$ is position to reflect input wavelength light exiting through the fourth output coupler port 50$_{o4}$ back into the resonator cavity 52.

The resonator cavity 52 will generally be formed using optical fiber 54 to interconnect the input and output WDM couplers. The optical fiber 54 can include one or more optical fiber types that have different Raman gain and Stoke shifting characteristics relative to the input and output wavelengths, $\lambda_{pbi}$ and $\lambda_{pbo}$, respectively. For example, small core fibers, such as dispersion compensating fibers, more efficiently promote Raman gain and can be used to form the resonator cavity 52. The fiber 54 will generally be formed in rings of various lengths for ease of handling, but can be formed in other shapes as may be appropriate.

The high reflectivity reflectors 54$_H$ can generally be high reflectivity, non-wavelength selective mirrors, although wavelength selective reflectors, such as Bragg gratings, at the input and output wavelengths can be used. The use of non-wavelength selective, high reflectivity reflectors provides additional flexibility in the configuring the CRR, because the reflectors do not constrain the selection of the input and output wavelengths of the CRR.

The lower reflectivity, wavelength selective reflector 54$_L$ ("feedback reflector") provides feedback control over the output wavelength $\lambda_{pbo}$. The reflective bandwidth of the feedback reflector 54$_L$ can be tailored to meet the required bandwidth of the output wavelength for a system 10. Also, the feedback reflector 54$_L$ can be tunable to provide additional flexibility in the output wavelength. Fixed or tunable fiber Bragg gratings, Fabry-Perot filters, and other reflective devices, can be used as the high and lower reflectivity reflectors, 54$_H$ and 54$_L$. For example, FIG. 6b shows a more specific embodiment, in which Bragg gratings are used as reflectors 54.

Figure 7:
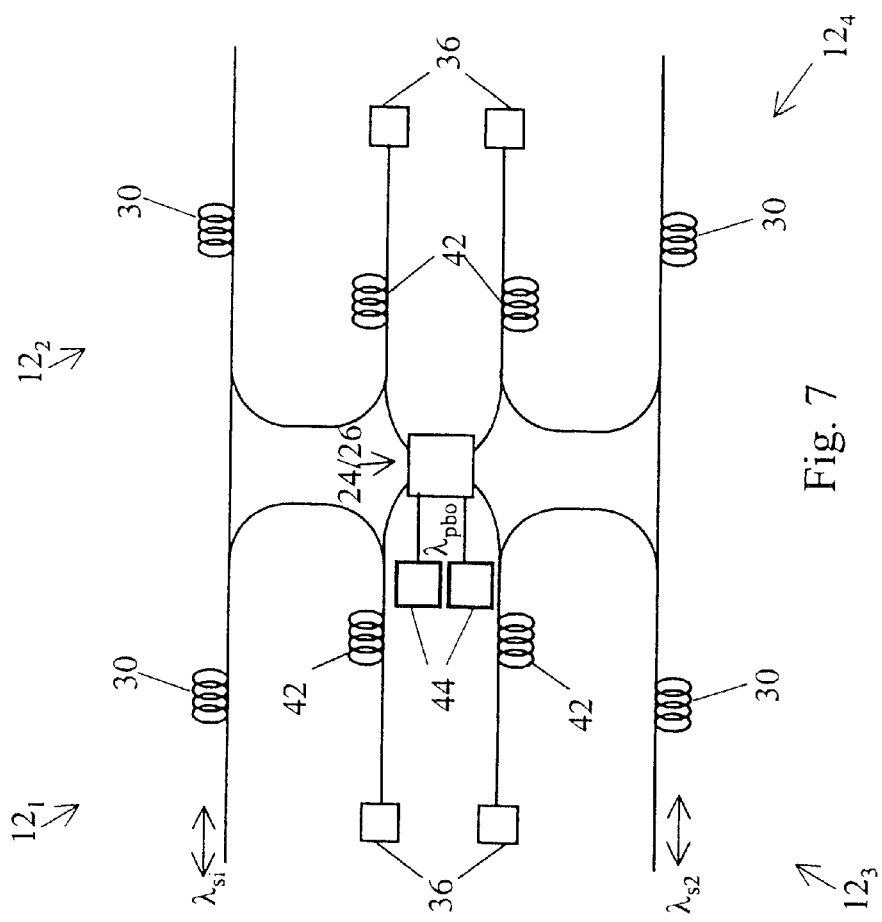

In various embodiments, pump booster power can be split and used to amplify pump power being provided to multiple amplifier stages disposed along one or more transmission fibers 14. FIG. 7 shows an exemplary embodiment, the pump booster power is divided using a distributor 26, such as a passive splitter, and supplied to the pump amplifying fibers 42 in four separate pump amplifiers 40. In this manner, the pump booster power, which can be several watts and the cost associated with of the pump amplifier 40 can be spread over a number of optical amplifiers 12. It may be also be desirable to combine two or more pump booster sources 44 using a combiner 24, such as a passive coupler, to provide additional redundancy in the system, as further shown in FIG. 7.

Exemplary operation of the amplifier 12 of the present invention will be described with regard to a Raman fiber amplifier in which the pump power being supplied to the Raman fiber amplifier is amplified using Raman pump amplifier. Signal wavelengths $\lambda_{si}$ are transmitted from the transmitters 18 to the receivers 20 through one or more of the optical amplifiers 12 in this example.

The exemplary optical amplifier 12 is configured to receive pump power ranging from 1400–1500 nm range to amplify signal wavelengths $\lambda_{si}$ in the 1500–1600 nm range via Raman amplification. The pump source 36 includes a plurality of laser diodes providing a plurality of pump wavelengths $\lambda_{pi}$ that can be counter- and/or co-propagated relative to the signal wavelengths $\lambda_{si}$ depending upon the system 10. The pump power is passed through the pump amplifying fiber 42 and pump booster power in the 1300–1440 nm range from the pump booster source 44 is counter-propagated through the pump amplifying fiber 42 to provide Raman amplification of the pump power.

Those of ordinary skill in the art will further appreciate that numerous modifications and variations that can be made to specific aspects of the present invention without departing from the scope of the present invention. It is intended that the foregoing specification and the following claims cover such modifications and variations.

What is claimed is:

1. An optical amplifier comprising:

an optical fiber medium;

a pump that supplies optical power in at least one pump wavelength in the optical fiber medium;

a pump amplifier that amplifies the pump optical power before the pump optical power is introduced into the optical fiber medium, wherein the pump amplifier comprises:

a pump amplifying fiber connected between the pump and optical fiber medium;

a pump booster source connected to the pump amplifying fiber comprising an optical power source and a cascaded Raman resonator, wherein the cascaded Raman resonator further comprises:

an input wavelength combiner having first, second, and third input wavelength ports;

an output wavelength combiner having first, second, and third output wavelength ports; and, a Raman gain medium optically connecting the first and second input wavelength combiner ports with the first and second output wavelength combiner ports to form a Raman resonator cavity, wherein the pump booster power exits the Raman resonator cavity at the output wavelength through the third output wavelength port and optical power is introduced through the third input wavelength port into the Raman resonator cavity.

2. The optical amplifier of claim 1, wherein the optical power source is a semiconductor diode.

3. The optical amplifier of claim 1, wherein the optical power source includes a plurality of semiconductor diodes.

4. The optical amplifier of claim 3, wherein the high power semiconductor diodes all produce optical power at a common wavelength.

5. The optical amplifier of claim 3, wherein the semiconductor diodes each produce optical power at a wavelength different then that produced by each other diode.

6. The optical amplifier of claim 3, wherein the input wavelength combiner includes a 2×2 WDM coupler having first, second, third, and fourth input wavelength ports.

7. The optical amplifier of claim 3, wherein the output wavelength combiner includes a 2×2 WDM coupler having first, second, third, and fourth output wavelength ports.

8. The optical amplifier of claim 6, wherein the fourth input wavelength port is optically connected to a high reflectivity input reflector positioned to reflect input wavelength optical power exiting the Raman cavity through the fourth input wavelength port back into the Raman cavity.

9. The optical amplifier of claim 8, wherein the reflector includes a fiber Bragg grating.

10. The optical amplifier of claim 7, wherein the fourth output wavelength port is optically connected to a high reflectivity output reflector positioned to reflect output wavelength optical power exiting the Raman cavity through the fourth output wavelength port back into the Raman cavity.

11. The optical amplifier of claim 10, wherein the reflector includes a fiber Bragg grating.

12. The optical amplifier of claim 3, wherein the third output wavelength port is optically connected to a low reflectivity output reflector positioned to reflect a portion of the pump booster power in the output wavelength exiting the Raman cavity through the fourth output wavelength port back into the Raman cavity.

13. The optical amplifier of claim 12, wherein the reflector includes a fiber Bragg grating.

14. The optical amplifier of claim 3, wherein the optical fiber medium is a Raman amplification medium.

15. The optical amplifier of claim 3, wherein the optical fiber medium is doped with rare earth elements.

16. The optical amplifier of claim 3, wherein the pump co-pumps the optical fiber medium.

17. The optical amplifier of claim 3, wherein the pump counter-pumps the optical fiber medium.

18. The optical amplifier of claim 3, wherein the pump booster source co-pumps the pump amplifying fiber.

19. The optical amplifier of claim 3, wherein the pump booster source counter-pumps the pump amplifying fiber.

20. The optical amplfier of claim 3, wherein:

the input wavelength combiner includes at least a 2×2 WDM coupler having first, second, third, and fourth input wavelength ports;

the fourth input wavelength port is optically connected to a high reflectivity input reflector positioned to reflect input wavelength optical energy exiting the Raman cavity through the fourth input wavelength port back into the Raman cavity;

the output wavelength combiner includes at least a 2×2 WDM coupler having first, second, third, and fourth output wavelength ports;

the fourth output wavelength port is optically connected to a high reflectivity output reflector positioned to reflect output wavelength optical energy exiting the Raman cavity through the fourth output wavelength port back into the Raman cavity; and, the third output wavelength port is optically connected to a low reflectivity output reflector positioned to reflect a portion of the pump booster power in the output wavelength exiting the Raman cavity through the fourth output wavelength port back into the Raman cavity.

* * * * *